Feb. 14, 1956 C. H. KENNEDY, JR., ET AL 2,734,613

POWER MECHANISM FOR TYPEWRITING MACHINES

Filed Oct. 23, 1952 8 Sheets-Sheet 1

CHARLES H. KENNEDY JR.
and WILLARD H. WADE
INVENTORS

BY Theodore E. Simonton
ATTORNEY

Feb. 14, 1956 C. H. KENNEDY, JR., ET AL 2,734,613

POWER MECHANISM FOR TYPEWRITING MACHINES

Filed Oct. 23, 1952 8 Sheets-Sheet 2

CHARLES H. KENNEDY JR.
and WILLARD H. WADE
INVENTORS

BY Theodore E. Simonton
ATTORNEY

CHARLES H. KENNEDY JR.
and WILLARD H. WADE
INVENTORS

BY Theodore E. Simonton
ATTORNEY

CHARLES H. KENNEDY JR.
and WILLARD H. WADE
INVENTORS

BY Theodore E. Simonton
ATTORNEY

CHARLES H. KENNEDY JR.
and WILLARD H. WADE
INVENTORS

BY Theodore L. Simonton
ATTORNEY

CHARLES H. KENNEDY JR.
and WILLARD H. WADE
INVENTORS

BY Theodore E. Simonton
ATTORNEY

CHARLES H. KENNEDY JR.
and WILLARD H. WADE
INVENTORS

BY Theodore E. Simonton
ATTORNEY

POWER MECHANISM FOR TYPEWRITING MACHINES

Filed Oct. 23, 1952 8 Sheets-Sheet 8

CHARLES H. KENNEDY JR.
and WILLARD H. WADE
INVENTORS

BY Theodore E. Simonton
ATTORNEY 2,734,613
Patented Feb. 14, 1956

2,734,613

POWER MECHANISM FOR TYPEWRITING MACHINES

Charles H. Kennedy, Jr., North Syracuse, and Willard H. Wade, Syracuse, N. Y., assignors to Smith-Corona Inc., a corporation of New York Application October 23, 1952, Serial No. 316,486

19 Claims. (Cl. 197—17)

The invention relates to improvements in power mechanism for typewriting machines and, more particularly, to power mechanism of the kind wherein different parts of a typewriting machine are individually and transitorily connective with a universal power-driven rotary actuator for power driving of such parts.

The invention is illustrated as embodied in a preferred form of power mechanism for actuating the several type bars of a typewriting machine, but it will be obvious to those skilled in the art that it may be employed to actuate other parts of the machine such, for example, as back spacing, escapement, case shifting and other parts.

Notwithstanding the intensive efforts of a host of skilled inventors over substantially the entire life of the typewriter art, and despite the manifest advantages of a power-actuated typewriter, such typewriters heretofore produced have possessed so many disadvantages that their acceptance by the public has been unduly limited. These disadvantages include excessive cost of manufacture, difficult assembly problems, undue complexity and number of parts in the several actuating trains for the type bars and other parts, excessive noise and shock and wear, improper control of the extent and speed of movement of the power driven parts, frequent necessity for repair and adjustments, and the difficulty of obtaining and maintaining uniform density of type impressions made by types having different face sizes or areas and of collectively varying the type blows without affecting the uniform density of impressions made by large and small type faces.

The invention has for its general purpose the provision of a simple and efficient power mechanism for typewriters free from the aforesaid disadvantages.

Particular further purposes of the invention are to provide a novel system of novel individual type bar actions in association with a universal rotary actuator, novel key mechanism for controlling such type bar actions, and novel means for individual and universal control of the type impacts.

Other purposes of the invention are to provide simple and efficient means for imparting power printing strokes from a rotary actuator to type bars pivoted in an arcuate array and to regulate the printing force of the type bars both individually and collectively, which means will operate with a minimum of noise, shock and wear, will smoothly accelerate the power printing strokes of the bars, will afford type impressions of like density for the large and small types and permit universal or collective variation of type impact without impairment of such uniformity of impression density for the large and small types, will equalize the load imposed on the actuator in power driving the arcuately arrayed type bars, and will provide equalized return forces for said type bars.

Further purposes of the invention are to provide an improved lever and cam device transitorily connective with a rotary driving roller or actuator to drive a spring-returned part of a typewriter, such as a type bar, and having means for regulating the extent of movement and rate of acceleration of the driven part while the cam is connected with the roller without changing the roller speed or the duration of the cam connection with the roller, and to provide means for varying the speed of the driven part at the time of disconnection of the cam from the roller by varying the roller speed while maintaining the selected regulated extent of drive of the driven part by the connected cam and roller.

Other purposes and advantages of the invention will appear from the following description of the preferred embodiment of the invention illustrated in the accompanying drawings.

Figure 1:
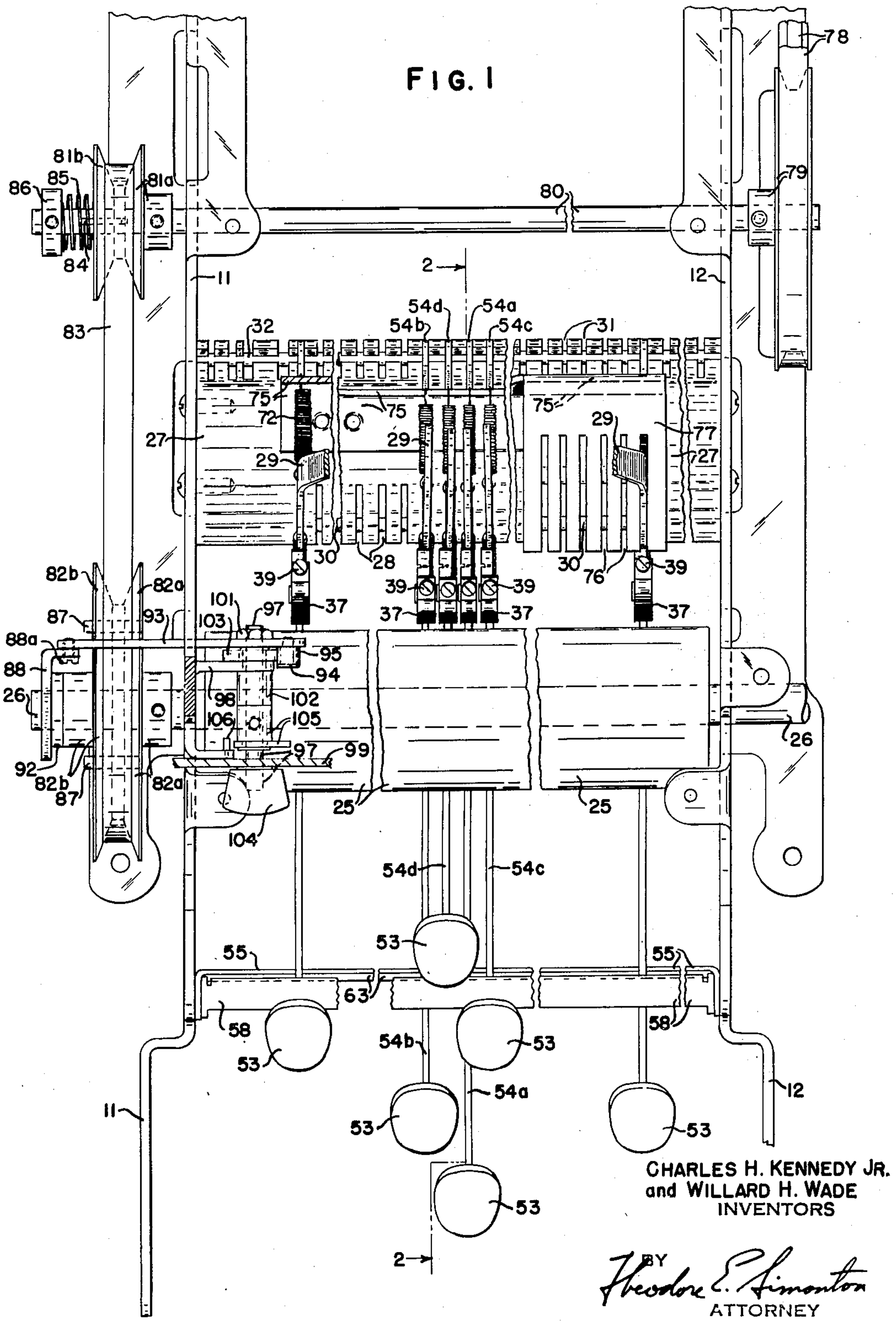
Fig. 1 is a fragmentary top plan view of a known style of front strike typewriter equipped with a power mechanism embodying the invention with certain parts omitted and others broken away for clarity of illustration of features of the invention.

Only so much of the known kind of typewriter in which the improvements are shown embodied has been illustrated as is necessary to a clear understanding of the invention. The typewriter has a platen roller 10 which is supported by a platen carriage (not shown) to travel endwise transversely of and above the rear portion of the main frame of the typewriter. The main frame comprises upstanding side plates 11 and 12 connected by a rearwardly inclined cross plate 13 with the upper edge of the cross plate underlying the platen roller.

The radially slotted type bar segment 14, and the type bar rest 15 attached thereto, support the system of normally cumbent type bars 16 (only a center and side one of which are shown) in arcuate array with the type bars pivoted in the segment slots on the arcuate pivot wire 17, as is usual. The segment and pivot wire are supported parallel to cross plate 13 by a rearwardly inclined carrier plate 18 which is case shiftable, by means not shown, from a normal position shown in Fig. 2 in which the type bars are supported for lower case printing to a lower position in the same plane to support the type bars for upper case printing. The normal position of the carrier plate is determined by engagement of case shift stops 19 and 20 and its shifted position by engagement of case shift stops 21 and 22. The type bars swing through printing strokes of like amplitude and of approximately 93 degrees. The type bars have identical short operating arms connected by pivots 23 with the rear ends of a system of links 24 of identical lengths, the pivots 23 lying in an arc which is concentric with that of pivot wire 17 and is located in a plane which is parallel to that of the pivot wire, as is usual. Also as usual, the two medial type bars of the system are pivoted equal distances from, and close to, the lowest part of the pivot wire 17.

The improvements, as shown, now will be described.

Extending horizontally across the typewriter and under the forward portions of the type bars is a rubber-faced power roller or universal rotary actuator 25 fixed on a shaft 26 journalled in the main frame side plates. During use of the machine the power roller is constantly rotated by means hereinafter described and in the direction indicated by the arrow shown adjacent said roller in Fig. 2. Individual type bar actions, each comprising a link 24, a sub-lever, a returning spring and a cam, and hereinafter more particularly described, are selectively connectible with the power roller to drive the respective type bars part way to the printing position after which they complete their printing strokes by acquired momentum and are spring-returned to normal rest position by means hereinafter particularly described. Individual cam tripping devices, hereinafter particularly described, are each associated with a different key lever of a system of spring-returned key levers hereinafter described and are operable to connect the respective type bar actions with the power roller for driving and automatic disconnection of the actions as hereinafter described.

Extending horizontally across the typewriter under the rear portions of the type bars, forward of the cross plate and of the path of case shifting movement of the segment carrier plate, is a straight fulcrum bar 27 for the system of sub-levers and the system of key levers. This fulcrum bar is fixed to side plates 11 and 12 and has vertically thickened front and rear edge portions, the front edge portion being provided with vertical guiding and stablizing slots 28 for a system of upstanding sub-levers 29 of the first class which are fulcrumed on a common straight horizontal fulcrum wire 30 extending across the typewriter through said slotted bar portion. The thickened rear edge portion of said bar is provided with vertical guiding and stabilizing slots 31 for the rear ends of the key levers which are fulcrumed on a common straight horizontal fulcrum wire 32 extending across the typewriter through said slotted bar portion with the slot for each key lever in fore and aft alignment with the sub-lever of the type bar action controlled by that key lever.

The upper arms of the sub-levers 29 are connected by pivots 33 with the forward ends of links 24 and are so graded progressively upward in length from the two medial and identical sub-levers of the system to the two side sub-levers of the system and have their upper portions so bent laterally inward that pivots 33 all lie in an arc which is concentric with and in a plane parallel to that in which pivots 23 lie. Pivots 33 and the upper ends of the sub-levers therefore move through arcs of like chordal extent on the complete printing strokes of the type bars and, on said type bar strokes, the angles through which the respective sub-levers rock decreases as the lengths of the upper arms of the sub-levers increase, while the effort required to rock the upper arms of the sub-levers increases as the lengths of said arms increase. These facts, together with the desirability of attainment of the desirable ends and avoidance of the disadvantages hereinbefore pointed out, have presented a baffling problem which the present invention solves in a startlingly simple and economical manner.

The lower arms of the sub-levers 29 have driving cams of identical construction connected thereto by pivots 34 and have cam-tripping levers of identical construction connected thereto by pivots 35. Except for certain universal bar actuating lugs or projections with which they preferably are provided as hereinafter described, said lower sub-lever arms all are of identical size and shape and normally stand in register as viewed across the machine. Said arms preferably extend downward and forward to pivots 34, as shown, the pivots 34 normally being axially aligned as are also the pivots 35.

All of the same are of identical construction, each cam comprising a main body part 36 formed of sheet metal and connected to a sub-lever 29 by a pivot 34, a pivotally adjustable portion 37 preferably formed of nylon or similar plastic and having a tread surface 37*a*, a hinge pivot 38 connecting the cam portions 36 and 37, and an adjusting screw device 39 for effecting and maintaining relative adjustments of said cam portions. The corresponding cam parts are of identical size and shape and all of the tripping levers 40 are of identical size and shape, the tripping levers preferably being formed of sheet metal. Each lever 40 has a short lower arm extending normally forwardly and substantially horizontally from its pivot 35 and a considerably longer upper arm extending normally forwardly and upwardly from its pivot and carrying a headed stud 41 the shank of which has a sliding fit in a normally fore and aft extending slot 42 in the body part 36 of the associated cam. Slot 42 is located close to and forward of cam pivot 34 and preferably is open at its forward end to facilitate assembly of the parts. A very slight movement of the lower arm of any lever 40 will swing the associated cam a substantial extent.

Normally the cams extend forwardly and upwardly between the sub-levers and the power roller and out of contact with the roller. Each cam and its tripping lever are held rocked into normal position by a returning spring 43 which normally holds a stop lug 44 on the body part of the cam rocked rearward against a stop lug 45 on, and depending from, the upper arm of the cam-carrying sub-lever 29, with springs 43 connecting the upper sub-lever arms with the body parts of the respective cams forward of and above pivots 34. Stop lugs 44 in the normal position of the type bar actions extend upward from the rear edges of lateral extensions 46 of cam parts 36.

Figure 5:
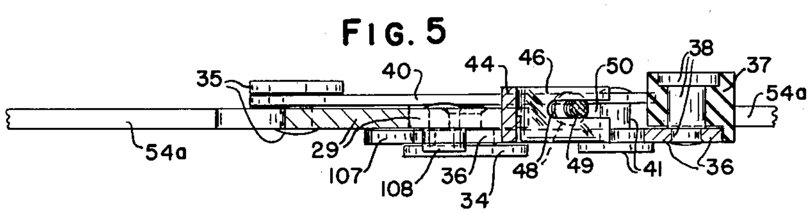
Fig. 5 is a detail sectional view on the line 5—5 of Fig. 3.

The metallic adjusting screws 39 have slotted upper heads for turning of the screws by a screw driver and have their threaded shanks passing through threaded bores in normally rearwardly directed extensions 47 of the nylon cam parts 37, which extensions overlie the lateral extensions 46 of cam parts 36 and behind the farthest parts of cam parts 37 from cam pivots 34. The adjusting screws have reduced lower heads 48 which are adapted to be passed through the threaded bores in extensions 47 and are connected with the threaded shanks of the screws by reduced neck portions 49 of the screws which extend through fore and aft extending slots 50 (Fig. 5) in lateral extensions 46 of cam parts 36. Slots 50 are open at their forward ends to permit engagement of neck portions 49 therein. At opposite ends of neck portions 49 the lower heads 48 and the threaded shank portions of screws 39 are provided with spheroidal surfaces 51 and 52, respectively, which maintain contact with the normally downwardly and upwardly directed faces respectively of the lateral extensions 46 of cam portions 36 in all relatively adjusted positions of cam portions 36 and 37. The plastic material of cam parts 37 in which screws 39 are threaded serves to securely hold the screws in adjusted positions.

The hinge pivot 38 of each adjustable cam is located as closely as is feasible to the reverse side of the tread surface of the cam and also to that end of said surface which is nearest the supporting pivot 34 of the cam, so that cam portion 37 will tilt as nearly as possible about said end of the tread surface during adjustments of the cam. Preferably, hinge pivot 38 of each cam is so located that, in the normal position of the cam, the pivots 38 and 34 are located at the same side of a straight line connecting the sub-lever fulcrum axis and the power roller axis and so that a straight line passing through pivots 34 and 38 will intersect the periphery of the power roller at least substantially at the horizontal level of the power roller axis. While the tread surface 37*a* of each cam may be flat, it preferably is, as shown, slightly convex, being curved on a relatively large radius of three inches, and it preferably is serrated as shown, or otherwise roughened, for good tractive engagement with the power roller. The outer edge of each cam portion 37 is curved sharply away from the power roller at both ends of the serrated tread surface 37*a*.

Figure 11:
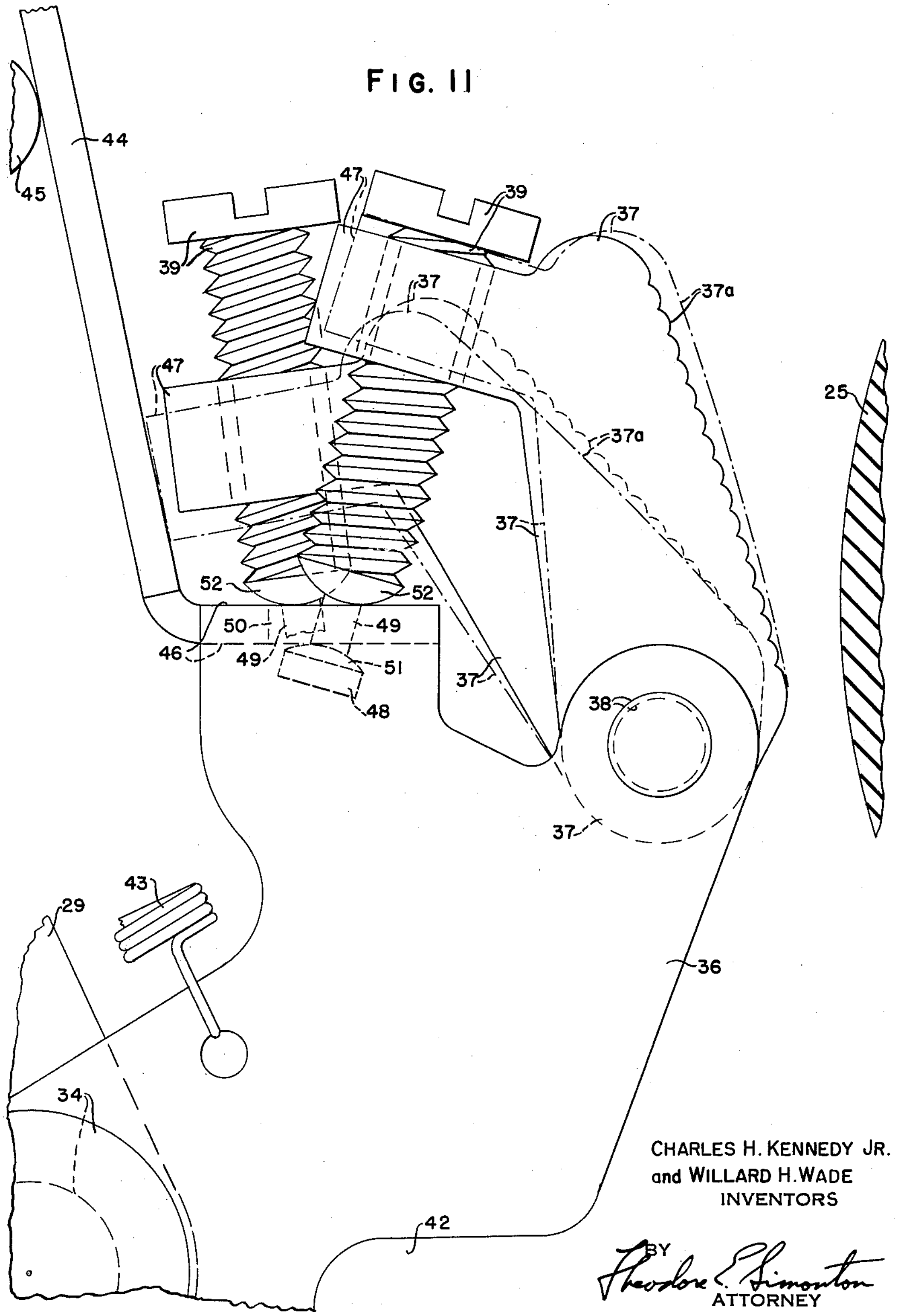
Fig. 11 is a detail sectional view showing in part the adjustable cams of a medial and a side type bar action and certain associated parts of the power mechanism.

By turning its adjusting screw 39 the pitch of any cam can be varied as desired between two fixed limits of adjustment. As best shown in dot-and-dash lines in Fig. 11, wherein two differently adjusted cams are shown in full lines, the pitch changing adjustments of each cam are limited by engagement of extension 47 with the head of the adjusting screw and with lug 44 on the cam part 36. The threaded engagement of the adjusting screw 39 with extension 47 of cam part 37, and the abutment of spheroidal surfaces 51 and 52 of the screw with extension 46 of cam part 36, positively maintain the selected relative adjustment of the cam parts 36 and 37. Each cam normally will stand clear of the power roller and also will clear said roller on the return strokes of its connected type bar in all adjusted positions of its portion 37 within the aforesaid limits. Also in all such adjusted positions the distance from the supporting pivot 34 of the cam to its tread surface 37*a* will increase progressively and smoothly from that end of said surface which is adjacent the hinge pivot 38 of the cam to the other end of said tread surface for a smoothly accelerated drive by the power roller and cam of the type bar connected to the cam.

Type keys 53 of a standard four-bank typewriter keyboard are depressible to actuate the tripping levers 40 to swing the respective cams about their supporting pivots 34 to effect driving engagement of the power roller with the cams. First, second, third and fourth bank key levers 54*a*, 54*b*, 54*c* and 54*d*, respectively support the keys in four stepped banks forward of the power roller with the keys preferably tilted forwardly as shown. The key levers are fulcrumed on the fulcrum rod 32, heretofore described, and extend forwardly therefrom to the keyboard and under the systems of sub-levers and cams and the power roller. Under the keyboard, the key levers extend through vertical guide slots in an upper guide comb 55 having end ears 55*a* secured to side plates 11 and 12 by clamping screws 56. The key levers have return stop lugs 57 adjustably bendable up and down and normally engaged under a vertically adjustable and horizontal return stop device 58 which has vertically slotted end portions 58*a* clamped to end ears 55*a* of comb 55 by the screws 56.

Figure 2:
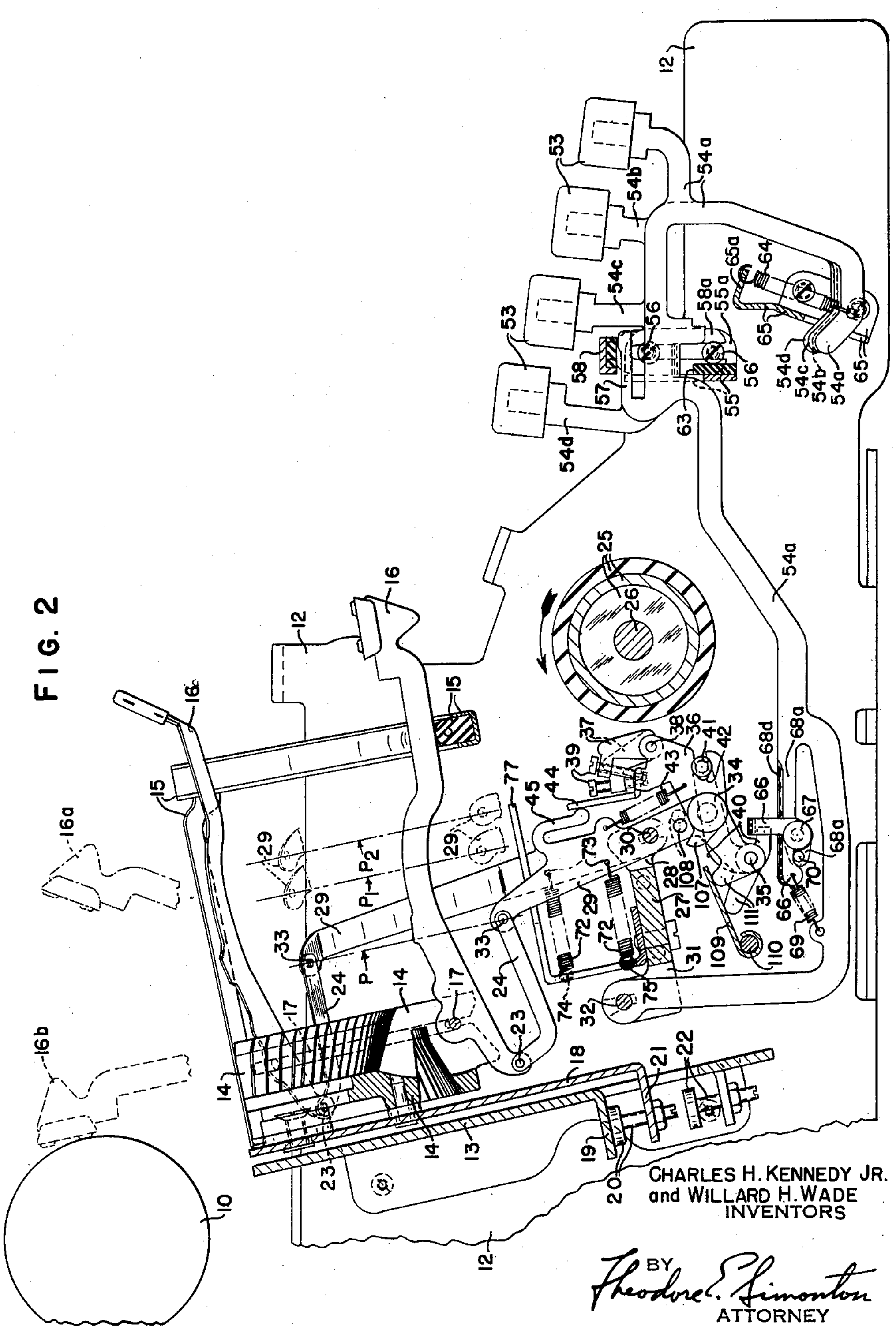
Fig. 2 is a fragmentary vertical sectional view of the improved typewriter taken medially of the system of type bar actions on the line 2—2 of Fig. 1.
Figure 10:
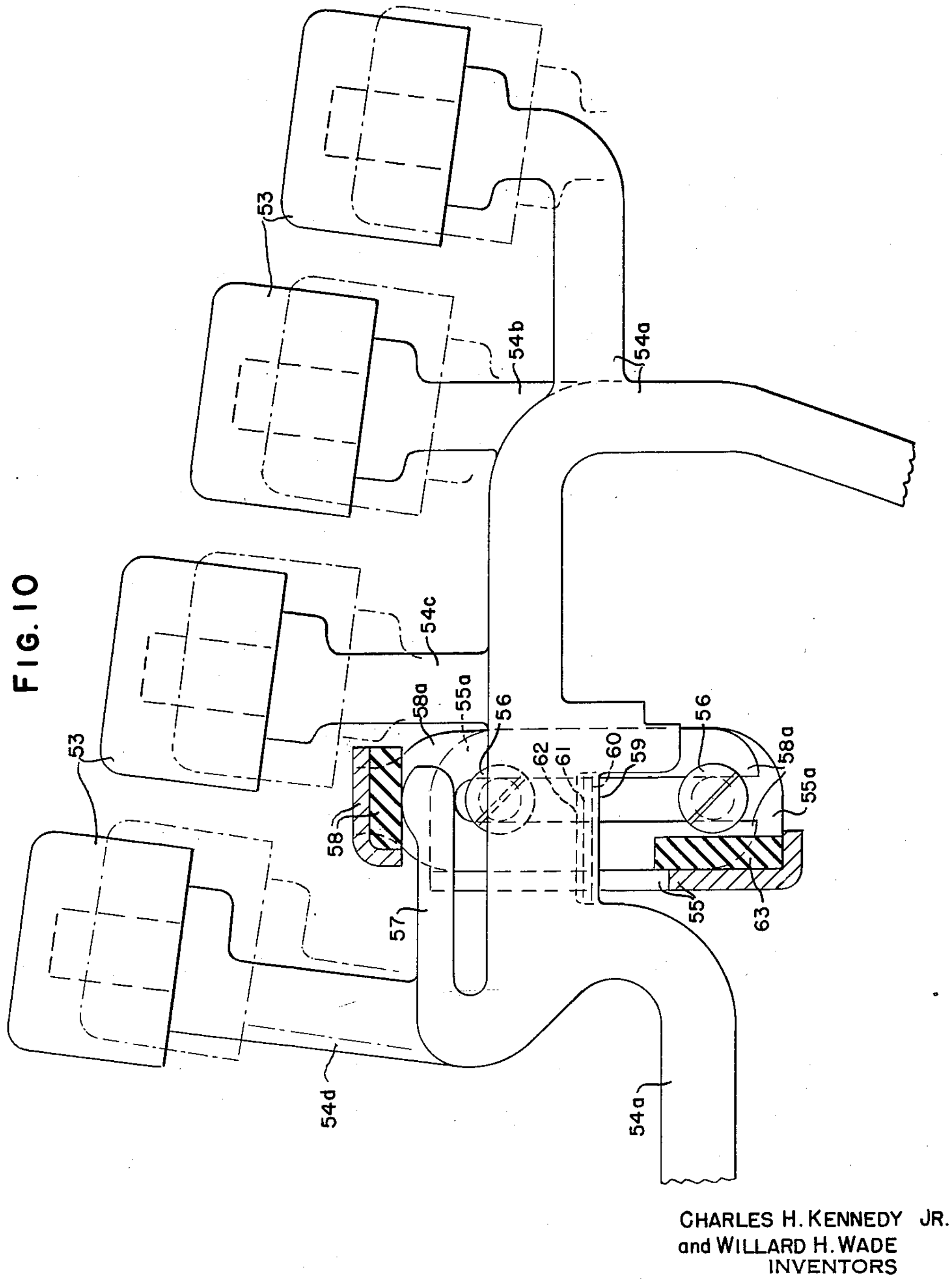
Fig. 10 is a detail sectional view on the same line as Fig. 2 showing on an enlarged scale the forward key-carrying portions of first, second, third and fourth bank key levers and associated key lever guiding and stop means.

For uniform maximum depression of all of the keys, the first, second, third and fourth bank key levers have stepped lower stopping edge portions 59, 60, 61 and 62, respectively, as more clearly shown in Fig. 10, for engagement with a horizontal key lever depression stop 63 which is fixed to guide comb 55. The key levers are returned by springs 64 of like size and inherent strength which are anchored at their upper ends to a flange 65*a* which extends straight across the machine from a lower key lever guide comb 65 located under the keyboard and attached to side plates 11 and 12. The key levers have downward and rearward extensions engaged in vertical guide slots in comb 65 and to which the lower ends of springs 64 are attached. For uniformity of key touch, the portions of these key lever extensions to which the springs are attached are stepped progressively downward from the fourth to the first bank key levers, as shown in Fig. 2, so that the extent of stretch of said springs in the returned positions of the key levers increases from those attached to fourth bank key levers to those attached to first bank key levers.

The cam tripping levers 40 are rockable about their pivots 35 by actuating dogs 66 to swing the cams about their pivots 34 into engagement with the power roller. Horizontal pivots 67 connect the respective dogs to normally horizontally disposed arms 68*a*, 68*b*, 68*c* and 68*d* of the first, second, third and fourth bank key levers, respectively. The dogs are of identical size and shape and the arms 68*a*, 68*b*, 68*c* and 68*d* normally are disposed beneath the systems of sub-levers and cams and the system of tripping levers and also are stepped at progressively slightly higher levels from the first to the fourth bank key levers to correspondingly step the dogs for uniform maximum rocking of the tripping levers by all of the dogs. Each dog has a normally rearwardly extending arm which is connected with its key lever by a returning spring 69 to normally yieldingly hold said arm engaged over a horizontal pin or stud 70 projecting laterally from the rear end of the dog supporting arm of the key lever with a laterally projecting nose or lug 71 at the upper end of a normally vertically extending arm of the dog overhanging and spaced above the upper edge of the normally forwardly extending lower arm of the associated trip lever 40, said spacing increasing from the dogs carried by first bank key levers to those carried by fourth bank key levers as indicated more clearly at *a*, *b*, *c* and *d* in Fig. 8.

The dog pivots 67 and the rear edges of the dog noses 71 preferably lie at least substantially in a vertical plane containing the sub-lever fulcrum rod axis. The key lever arms to which the dogs are pivoted are bendably adjustable up and down and the cam return stop lugs 45 on the sub-levers are bendably adjustable fore and aft so that compensation may be made for inequalities in manufacture of parts, engagement of the cams with the power roller may be insured, and uniform normal clearance between the power roller and all of the cams may be attained if desired.

The roller driven type bar actions have returning springs 72 arranged as follows to act with equal effectiveness on all of the actions. These springs are all of equal size and inherent strength and each has an anchor 73 at its front end to a different sub-lever 29 and an anchor 74 at its rear end to a spring anchor bar 75 which is disposed in a plane which is parallel to the plane P (Fig. 2) containing link pivots 33 and to the plane of the type bar segment. The two sets of anchors are so arranged that when the actions are at rest the springs extend in paths normal to plane P with all of the springs slightly and equally stretched, the springs being disposed progressively higher from the medial to the side actions with their anchors 73 all in one plane parallel to plane P and their anchors 74 all in a second plane parallel to plane P. The anchors 73 to sub-levers 29 are at constant leverage ratio points along said sub-levers so that, as the respective sub-levers are swung to move link pivots 33 into plane $P^2$ (Fig. 2) at the ends of the printing strokes of the type bars, each sub-lever will stretch its returning spring to the same extent.

Preferably, a number (such as six) of the longest sub-levers 29 at each side of the system of type bar actions have their upper arms guided against lateral tilting in fore and aft extending slots 76 formed in extensions 77 projecting forwardly from the upper edge of the spring anchor bar 75 at opposite ends of said bar. Desirably the upper edge of bar 75 is arcuate between said extensions. Bar 75 has a bottom flange which is seated on the top of the fulcrum bar 27 and held to bar 27 by screws, as shown.

To facilitate explanation and understanding of certain advantages of the invention, the cams of the respective type bar actions are shown adjusted to positively drive all of the type bars through an angle of approximately 65 degrees and cause them to complete their printing strokes by acquired momentum from the type bar position indicated at $16^a$ to that indicated at $16^b$ (Fig. 2). When so systematically adjusted, the pitches of the respective cams decrease progressively from that of the cams of the two medial actions of the system of type bar actions to that of the two side actions at such a rate that the respective cams will coact with the power roller to positively drive the respective graduated sub-levers 29 through angles of throw which decrease from the two medial sub-levers to the two side sub-levers in direct proportion to the varying leverage ratios of the sub-lever arms so that link pivots 33 wil be driven through arcs of like chordal amplitude from plane P to plane $P^1$ (Fig. 2) in like time intervals and at like rates of speed and acceleration of their driven movement for completion by momentum of like terminal portions of the printing strokes of the type bars by further swinging of the bars and sub-levers to finally carry link pivots 33 to plane $P^2$ (Fig. 2).

Such a systematic adjustment as aforesaid, and as shown, compensates for the different leverage ratios of the type bar actions from the center to each of the sides of the system of actions, equalizes the load imposed by the respective actions on the power roller, equalizes the wear on said roller, and theoretically equalizes the ultimate impact force with which all of the type bars strike the platen. However, for reasons well known in the art, including varying sizes of type faces from type bar to type bar and varying stiffness or friction in the respective actions as originally made or as result of wear in use, if uniform density of type impressions is to be attained in a power type bar action of the momentum printing type it is necessary to make provisions for individual regulation of the ultimate impact force of the respective type bars. A further feature of the invention resides in the fact that such individual regulation can be attained in a desirable and effective manner simply by increasing or decreasing the pitch of the cam of any particular action until the desired density of type impression is obtained. Very slight changes of cam pitch will substantially alter the type blow. As will more clearly appear from Fig. 11, wherein a medial type bar action cam and a side type bar action cam are shown in full lines adjusted for equal type bar drives, the pitch of both cams can be increased or diminished. The full range of adjustment shown of the respective cams has been found in practice ample to effectuate the several purposes above described.

The invention further provides means for effecting readily by a typist a universal or collective regulation of the type impacts to adapt the machine for different classes of work such, for example, as typing a single sheet or of making different numbers of carbon copies of a typed original sheet. This collective regulation is effected by varying the speed of rotation of the power roller 25 by means shown in Figs. 1, 6 and 7.

An electric motor (not shown), mounted in the rear part of the main frame and controlled by a suitable starting and stopping switch, has fixed on its shaft at the right hand side of the machine a pulley (not shown) which, through a belt 78 drives a pulley 79 located at the right hand side of the machine. Pulley 79 is fixed on the right hand end portion of a horizontal cross shaft 80 which is journalled in side plates 11 and 12, and extends across the machine behind the system of type bar actions. At the left hand side of the machine a known V-type divided pulley $81^a$–$81^b$ on cross shaft 80 and a known V-type divided pulley $82^a$–$82^b$ on a shaft 26 of power roller 25 are connected by a known V-type driving belt 83 to drive the power roller continuously and in the direction indicated by the arrow in Fig. 2 while the machine is in use. The inner half $81^a$ of one divided pulley is fixed to shaft 80 and the inner half $82^a$ of the other divided pulley is fixed to shaft 26. The outer half $81^b$ of one pulley is keyed to shaft 80 at 84 to turn with and slide axially of said shaft and is urged toward the pulley half $81^a$ by an expansive spring 85 which is coiled around shaft 80 between pulley half $81^b$ and a collar 86 fixed on shaft 80. The outer half $82^b$ of the other divided pulley is held to turn with and slide axially of shaft 26 by pins 87 fixed to pulley half $82^a$ and slidably protruding through holes in pulley half $82^b$.

The aforesaid known kind of change speed drive between shafts 80 and 26 is controllable by a typist through the following novel means. A laterally tiltable and upstanding lever 88 is loosely fulcrumed at its lower end below shaft 26 by means of a stud bolt 89 which is held to, and projects outwardly from, side plate 11, with the head of said bolt engaging the outer face of lever 88 and the shank of the bolt extending loosely through a somewhat larger hole 90 in the lower end of the lever. About midway between its ends the lever has a clearance hole 91 for the adjacent end of shaft 26 and also presses against a thrust washer 92 which is slidable axially on shaft 26 and in turn presses against the axially slidable half $82^b$ of pulley $82^a$–$82^b$. The upper end of the lever 88 is connected by a fore-and-aft extending pivot $88^a$ to the outer end of a pull link 93 the inner end of which link carries a fore-and-aft extending stud 94 preferably journalling an anti-fraction roller 95. Link 93 extends through a clearance hole 96 in side plate 11. A fore-and-aft extending control shaft 97 extends loosely through both a lug 98 on side plate 11 and a known front casing plate 99 which is secured to the main frame and located above the rear end of the keyboard. Shaft 97 also extends through a horizontal slot 100 in pull link 93 to support said link between side plate 11 and the roller 95, and said shaft has a retaining nut 101 threaded on its rear end at the rear face of link 93. The shaft 97 is journalled in a bearing sleeve 102 fixed to lug 98 and at the rear face of lug 98 a cam 103 is fixed on said shaft. This cam has a spiral edge of low pitch extending part way around shaft 97 and in contact with the roller 95 on stud 94. A knob 104 is fixed on the forward end of shaft 97 in front of plate 99.

Figures 6, 7, 8:
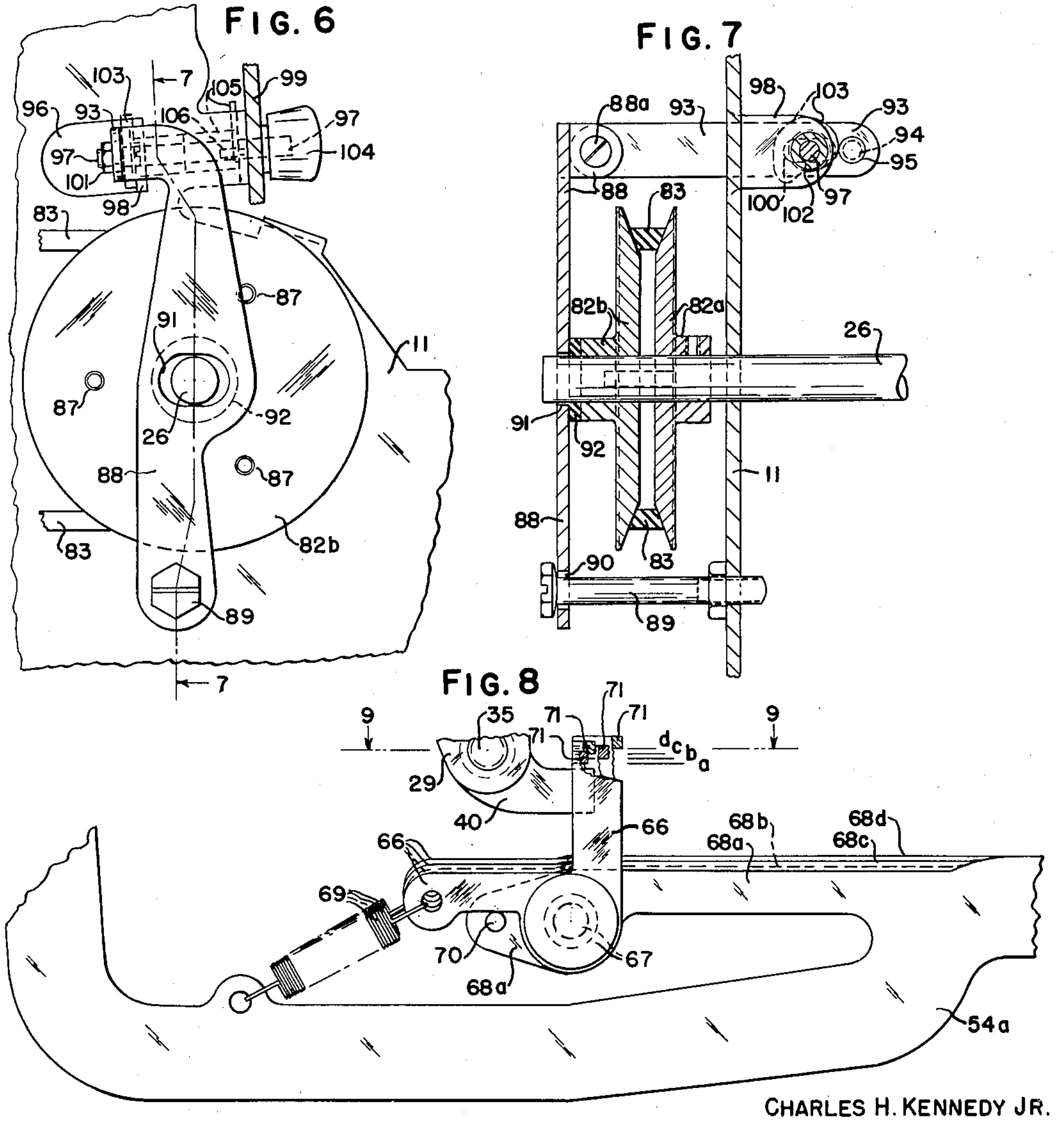
Fig. 6 is a detail end elevation of the power roller speed control means.
Fig. 7 is a detail sectional view on the line 7—7 of Fig. 6.
Fig. 8 is a detail sectional view on an enlarged scale taken on the same line as Fig. 2 and illustrating parts of the controlling connections between first, second, third and fourth bank key levers and the power-driven type bar actions controlled by said key levers.
Figure 9:
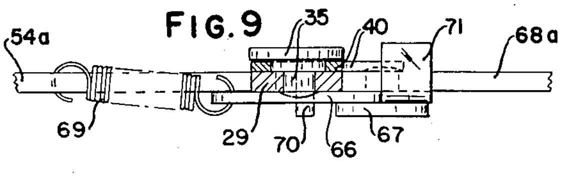
Fig. 9 is a detail sectional view on the line 9—9 of Fig. 8.

By turning knob 104 to rotate cam 103 clockwise as viewed in Fig. 7 the link will be drawn to the right and lever 88 will axially contract pulley $82^a$–$82^b$ to decrease the speed of rotation of the power roller, while by turning the knob to rotate the cam counterclockwise said pulley will axially expand to raise the roller speed. Spring 85 acts on pulley $81^a$–$81^b$ to maintain belt 83 under constant tension. Pressure of the low pitch cam against roller 95 will maintain selected adjustments for different speeds of the power roller. A stop arm 105 has a hub portion fixed to shaft 97 between bearing sleeve 102 and the front plate 99 and this stop arm is coactive with a stop pin 106 which is fixed to an inturned lug on side plate 11 to so limit the rotation of shaft 97 to a partial revolution that the spiral edge of cam 103 always engages roller 95 and that the pulley $82^a$–$82^b$ can only be expanded and contracted axially between two fixed limits which so limit the range of speed change of the power roller that the speed cannot be reduced below that sufficient for legible typing and for high speed typing or be so increased as to cause excessively heavy type impacts which will cut the paper on which typing is done. A range of surface speeds of the power roller of from approximately 1100 inches to approximately 1320 inches per minute has been found desirable in the machine shown. By variably screwing bolt 89 through side plate 11 compensation can be made for the use in the machine of different driving motors each effective to drive belt 78 at a different speed.

Preferably, each type bar action is provided with overthrow limiting stop means for its cam, each such stop means consisting of a stop lug 107 on part 36 of the cam and a stop pin 108 projecting laterally from the lower arm of the sub-lever to which the cam is pivoted. As will appear from Figs. 2, 3 and 4, the stop lugs do not make contact with the stop pins in normal operation of the type bar actions. However, if two or more type bars become jammed with the power roller in driving engagement with the cams connected to those type bars, the stop lugs will be carried into engagement with the stop pins by a somewhat greater than normal turning of the cams about pivots 34 to prevent the roll from further swinging the cams and damaging the cam returning springs 43 by abnormal stretching of the springs.

Preferably, the machine is provided with a ribbon vibrator operating and straight universal bar 109 which extends across the machine under the fulcrum bar 27 and behind the lower arms of the sub-levers 29. Said universal bar is fixed to a horizontal rock shaft 110 journalled in side plates 11 and 12. The lower arms of the sub-levers are provided with projections or noses 111 which are engaged under the universal bar to rock said bar upwardly and rearwardly on the printing strokes of the type bars. The projections 111 are stepped from the two medial type bar actions to the two side type bar actions progressively closer to the rock shaft 110 for a uniform rocking throw of the universal bar by all of the type actions.

Figure 3:
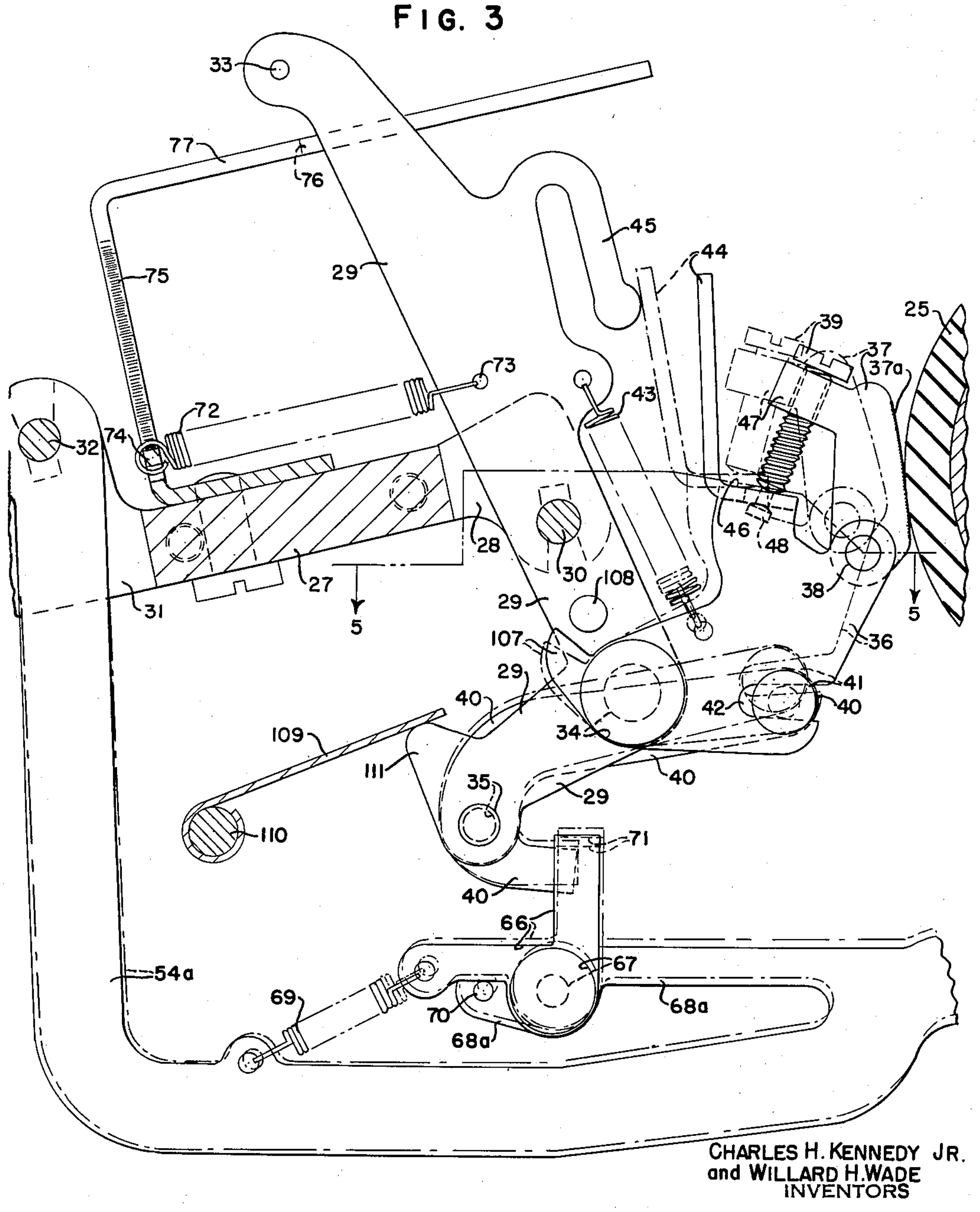
Figs. 3 and 4 are detail sectional views on an enlarged scale taken on the same line as Fig. 2 and illustrating the operation of one of the two medial type bar actions.
Figure 4:
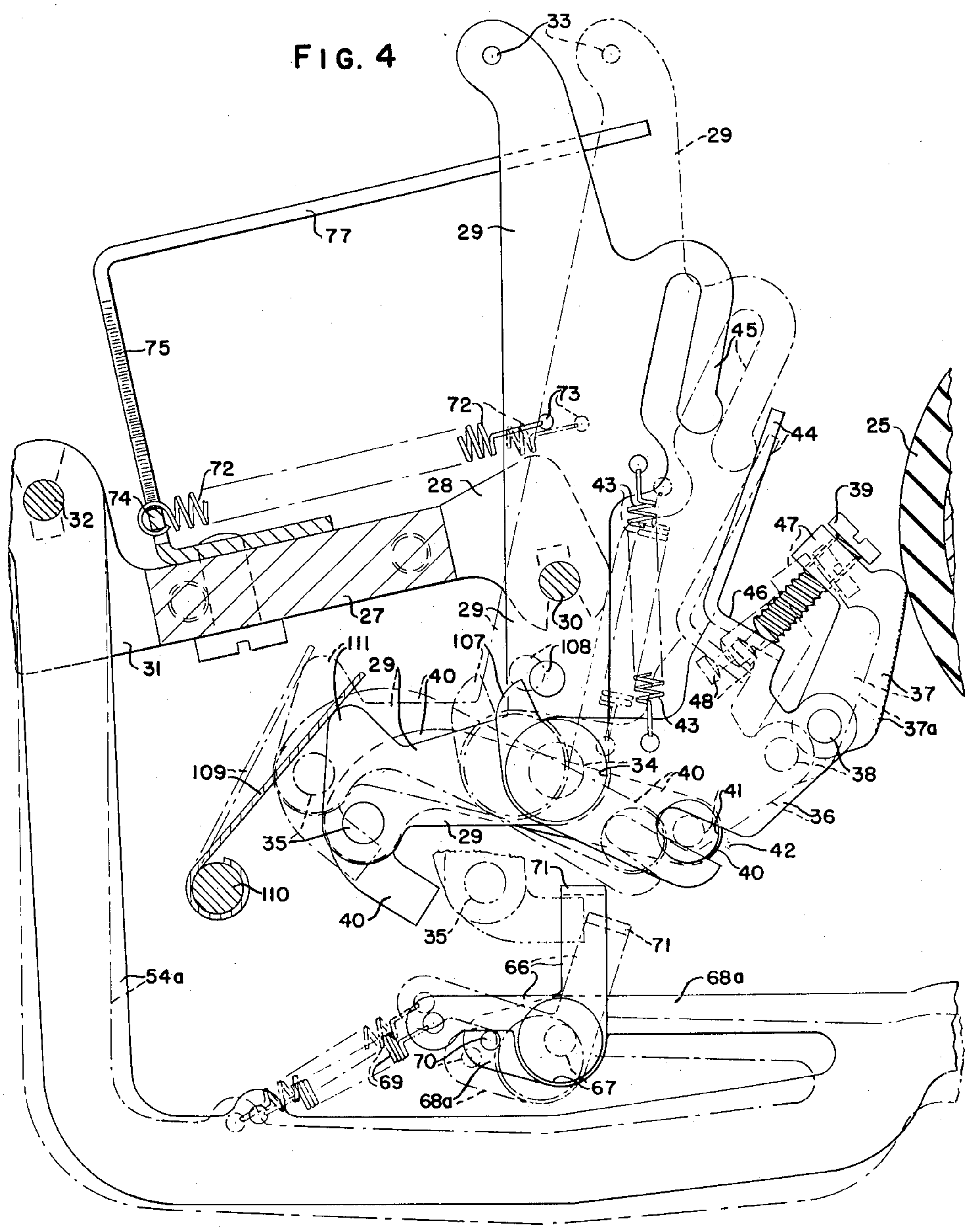
Figures 12, 13, 14:
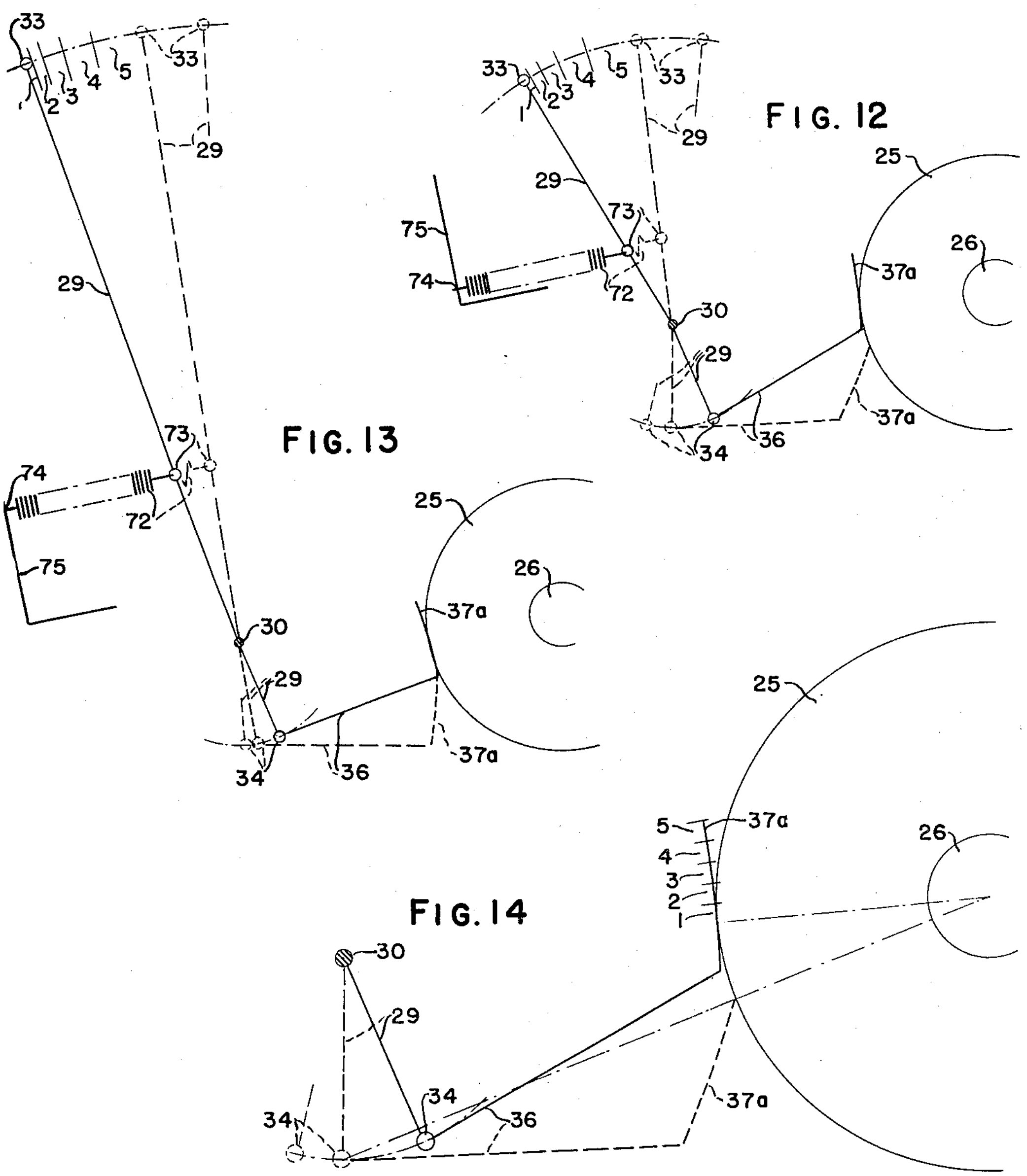
Figs. 12 and 13 are diagrammatic views showing on an enlarged scale respectively parts of a medial and a side type bar action at the start and end of their driving connections with the power roller.
Figs. 14 and 15 are similar but further enlarged views of portions of said two actions.

The operation of the improved power mechanism is believed obvious from the foregoing description and the drawings but will be summarized briefly with especial reference to Figs. 3, 4, 12, 13, 14 and 15. Depression of the controlling key for any type bar action will cause the actuating dog 66 carried by the actuated key lever to rock the cam-tripping lever 40 of that action and swing the cam of the action about its pivot 34 into drivable contact with the power roller, as shown in Figs. 3, 12 14 in full lines in the case of one of the two medial type bar actions, and as shown in full lines in Figs. 13 and 15 in the case of one of the two side actions.

All of the cams make full drivable contact with the power roller an equal short distance above the lower or leading ends of their respective tread surfaces $37^a$ and they break contact with the roller when the upper or trailing ends of their respective tread surfaces reach a straight line connecting the power roller axis and the pivot 34 of the actuated cam. The drivable contact of all cams is made and broken without shock and continues during like angles of rotation of the power roller. The steeper cams of the medial actions make drivable contact with the power roller approximately on a straight line connecting the power roller axis and the sub-lever fulcrum axis and, as the pitches of the cams decrease from action to action to the two actions at opposite sides of the system of actions, the drivable contact is made progressively lower down around the periphery of the power roller.

Figure 15:
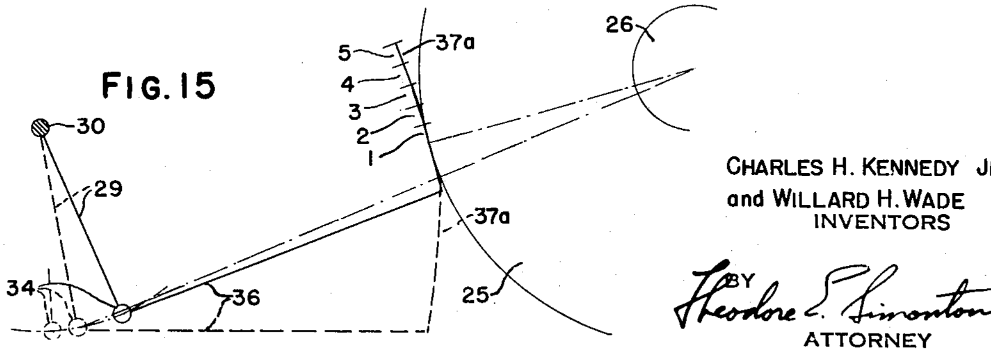

Driving of an actuated cam by the power roller through equal linear increments of the cam tread surface, such as those designated 1, 2, 3, 4 and 5 in Figs. 14 and 15, will rock the upper end of the connected sub-lever through progressively and smoothly increasing type bar accelerating increments, such as those designated 1, 2, 3, 4 and 5 in Figs. 12 and 13, these increments being the same for all actions with the cams adjusted as shown to drive all the type bars through the same angle (approximately 65 degrees) while the cams are in contact with the power roller.

When the actuated cam breaks contact with the power roller, the type bar completes its printing stroke by momentum and carries the sub-lever and cam with it. During this momentum period of the printing stroke the cam spring 43 swings the cam back around its pivot 34 into contact with stop 45 on the sub-lever. These movements of the sub-lever and cam are indicated in dot-and-dash lines in Fig. 4 and restore the normal rocked relation of the cam to the sub-lever so that, as the return spring 72 of the type action drives the parts back to normal position, the cam will pass the power roller without contacting the roller. If the type key is held depressed until the type action is returned, the lower arm of cam-tripping lever 40 will strike the rear edge of nose 71 of its actuating dog 66 and rock the dog as shown in dotted lines at the bottom of Fig. 4 so that no repeat operation of the action will occur. On subsequent release of the depressed type key, the actuated key lever and associated dog 66 will assume their respective normal positions.

Modified adjustments of the cams to compensate for varying stiffness or friction in the several type bar actions, and for varying type faces on the several type bars, can be made as before described. Such compensation, and the collective regulation of the type impacts for manifolding, etc., above described, are accomplished without the employment of means causing shock, noise and wear. Adjustments of any cam which increase its pitch will increase both the speed and extent of movement of a type bar during the period of connection of the cam with the power roller, and adjustments which decrease the pitch of the cam will decrease both the speed and extent of movement of the type bar during said period.

We claim:

1. A power mechanism for typewriting machines comprising a power driven roller, a part impellable from a rest position to which it is biased to return, a cam having means to vary its pitch and which cam is carried by said part for movement relatively thereto in the rest position of the part into run-out drivable engagements with the roller at the conclusion of which both the extent and the speed of movement of the impelled part varies in accordance with the adjusted pitch of said cam, spring means coactive with said part and cam to bias the cam when disengaged from the roller to assume a rest relation to said part in which the part is returnable to its rest position without engaging the cam with the roller, and stop means on said part and said cam engageable to prevent movements of said cam away from its rest relation to said part which substantially exceed those required for run-out drivable engagements of the cam with the roller.

2. A power mechanism for typewriting machines comprising a part impellable in a fixed path from a rest position to which it is biased to return, a power driven roller rotative about a fixed axis which is transverse to the path of movement of said part, a cam comprising a body portion having a pivotal connection to said part supporting the cam for oscillation about an axis parallel to the roller axis from and to a roller-clearing rest relation to said part from which said cam is rockable in the rest position of the part into part-impelling rolling engagements with the roller, said cam having a roller-engaging tread portion adjustable eccentrically to run out of engagement with the roller at different points in the impulsion of the part toward an actuated position into which the part finally is movable by momentum, means biasing the cam to assume its rest relation to said part when disengaged from the roller, stop means on said part and said body portion of the cam abuttive to determine the rest relation of the cam to said part, means operable at will on the body portion of the cam in the rest position of the part to rock the cam into engagement with the roller, and stop means on said part and said body portion of the cam abuttive to prevent rocking movements of said cam away from its rest relation to said part which substantially exceed those required for run-out engagements of the cam with the roller.

3. A power mechanism for typewriting machines comprising a part impellable in a fixed path from a rest position to which it is biased to return, a power driven roller rotative about a fixed axis which is transverse to the path of movement of said part, a cam having a body portion pivotally connected to said part to support the cam for oscillation about an axis parallel to the roller axis from and to a roller-clearing rest relation to said part from which the cam is rockable in the rest position of the part into part-impelling rolling engagements with the roller, said cam having a roller-engaging tread portion adjustable eccentrically to run out of engagement with the roller at different points in the impulsion of the part toward an actuated position into which the part finally is movable by momentum, means biasing the cam to assume its rest relation to said part when disengaged from the roller, stop means on said part and said body portion of the cam abuttive to determine the rest relation of the cam to said part, and means operable at will on the body portion of the cam in the rest position of the part to rock the cam into engagement with the roller, said cam comprising means pivotally connecting its body and tread portions for tilting adjustment of its tread portion about an axis which is parallel to the roller and is located substantially at that end of the tread portion which is nearest to the roller in the rest position of the impellable part, and said cam further comprising means for positively holding its tread portion in variably tiltably adjusted positions against adjustment changing tilting in both directions.

4. A power mechanism for typewriting machines, as claimed in claim 3, wherein said adjustment holding means is operable to adjustably tilt said tread portion back and forth.

5. A power mechanism for typewriting machines, as claimed in claim 3, having means for positively limiting the range of adjustment of said tread portion.

6. A typewriter having a power mechanism comprising a power driven roller extending transversely of the typewriter, a drivable unit biased to a rest position and including a type bar and an upstanding lever which is drivingly connected at its upper end with the type bar and is rockable about a fulcrum axis which is located behind and parallel to the roller, a cam pivotally held to said lever at a point below said lever axis for rocking in a downward direction about an axis which is behind and parallel to the roller into unit impelling run-out rolling engagements of the cam with the roller which free the unit for momentum impacts of the type bar against a platen, said cam having provision for varying its pitch to regulate the platen impacting force of the type bar, means biasing the cam in an upward direction about its pivotal axis to assume a roller-clearing rest relation to the lever when disengaged from the roller, and key-operable means extending rearwardly under the roller for rocking the cam in said downward direction in the rest position of the unit into rolling engagement with the roller.

7. A typewriter having a power mechanism as claimed in claim 6, wherein the cam pitch is variable without changing the rest relation of the cam to the lever.

8. A typewriter having a power mechanism as claimed in claim 6, wherein said cam comprises a tread surface bearing portion for engagement with the roller, a body portion by which the cam is pivotally held to the lever as aforesaid and to which the tread surface bearing portion is pivotally held for adjustment about an axis parallel to the roller, and manually operable means for pivotally adjusting the tread surface bearing portion back and forth and positively holding it selectively adjusted against accidental adjustment changing back and forth movements.

9. A typewriter having a power mechanism as claimed in claim 6, wherein the means for rocking the cam into rolling engagement with the roller comprises a cam tripping lever fulcrumed on the type bar driving lever below the axis of the type bar driving lever for rocking about a pivotal axis parallel to that of the cam and having a pin-and-slot connection with the cam for conjoint rocking of the cam and its tripping lever in the same direction about their pivotal axes, a depressible key lever rockable about a fulcrum axis which is parallel to the tripping lever axis, and a dog pivoted to said key lever forward of said key lever fulcrum axis and biased to an upstanding rest position on the key lever in which said dog is engageable over part of the tripping lever to rock said tripping lever in a direction to engage the cam with the roller when the key lever is depressed, said dog being rockable against its bias by the tripping lever to permit said cam and drivable unit to return to rest position while the key lever is held depressed.

10. A typewriter having a power mechanism as claimed in claim 6, having cam overthrow limiting means effective to arrest abnormal rocking of the cam against the force of its biasing means at a point somewhat beyond that required for run-out drivable engagement of the cam with the roller.

11. A typewriter having a power mechanism as claimed in claim 6, having means for adjustably varying the clearance between the cam and roller in the rest position of the cam and drivable unit.

12. A power mechanism for typewriting machines comprising a power driven roller, a set of drivable units biased to a rest position and each including a type bar and a type bar actuating lever which is drivably connected with said bar and is rockable transversely of the roller, said levers being actuative to impel the type bars between rest and platen impacting positions and the type bars being pivotally mounted to impact a platen to print at a common printing point, a set of identical cams pivotally mounted on the respective levers at like points for rocking relatively thereto into and out of type bar impelling run-out drivable engagements with the roller which terminate before platen impacts of the type bars which are thereafter effected by momentum, means individual to the respective cams for biasing them to roller-clearing rest relations to the levers which pivotally carry them, each cam having provision for varying its pitch to individually regulate the platen impacting force of the several type bars, a set of identical cam rocking levers pivoted on the respective type bar actuating levers at like points and connected at like points with the respective cams for rocking of each cam about one axis and of its rocking lever about another and parallel axis conjointly, and means for selectively rocking said cam rocking levers to selectively rock the cams into rolling engagement with the roller.

13. A power mechanism for typewriting machines comprising a power driven roller rotative about a horizontal axis, a set of type actions individually impellable to make imprints at a common printing point and biased to rest position, a set of identical oscillative cams each pivoted on a different one of the type actions and biased around its pivot to a rest relation to the type action from which it is rockable into a roll-free engagement with the power roller to impellably couple the type action with the roller and thereafter uncouple it to make an imprint under its own momentum, said cams being individually adjustable to vary the pitch thereof to regulate the density of imprints makeable by the respective type actions individually, means on each type action and the cam pivoted thereon for arresting biased movements of the cam at the same point around its pivot irrespective of the pitch adjustment of the cam, means for selectively rocking the cams into type action coupling engagement with the roller, and means on each type action and on the cam pivoted thereon abuttive to prevent a rocking movement of the cam away from its rest relation to the type action which substantially exceeds that required for a roll-free engagement of the cam with the power roller.

14. A typewriter having a power mechanism comprising a power driven roller rotative about a horizontal axis which extends transversely of the typewriter, a set of upstanding levers spaced along said roller and rockable about a common horizontal fulcrum axis located behind and parallel to the roller, said levers extending above and below their fulcrum axis and having their upper ends arrayed in an arc which curves upward from the center to the end levers of the set, a type bar segment which curves upward from the center to the end levers of the set, a set of front strike type bars pivoted in the segment and supported in a normally cumbent array, a set of links of identical length each directly connecting the upper end of a different one of the upstanding levers to a different one of the type bars, a set of identical cams each pivotally held at a like point to a different one of said levers below the fulcrum axis of the levers for downward rocking into a drivable engagement with said roller to impel a type bar part way to printing position and to run out of such engagement before the type bar prints, means biasing said cams individually upwardly to like roller-clearing rest relations of the cams to said levers, each cam having means for varying its pitch for actuation of the several levers and their connected type bars by the roller to make imprints of equal density, a set of type keys forward of the rollers, and means extending under the roller from each key and operable by the keys for selectively rocking the cams downwardly into drivable engagement with the roller.

15. A power mechanism for typewriting machines comprising a set of type actions operable from rest to imprinting positions, a set of identical cams each having a supporting portion and a portion bearing the entire tread surface of the cam, each cam having its supporting portion biased to abut and be arrested by a different one of said type actions and pivoted to the action for rocking by and against its bias about a horizontal axis extending transversely of the set of cams and set of type actions, each cam having its tread surface bearing portion pivoted to its supporting portion for tilting adjustment about an axis parallel to and eccentric to the pivotal axis of the supporting portion, each cam having means for variably tilting its tread surface bearing portion relatively to its supporting portion from one to the other of two fixed limits and positively holding it against accidental tilting in both directions, said tread surface bearing portion having a tread surface which in all tilted positions of said portion within said limits is increasingly eccentric to the pivotal axis of the supporting portion from a low end of said surface adjacent the pivotal connection between the cam portions to a high end of said surface, a power driven roller extending horizontally transversely of the set of type actions and arranged for rocking of the cams against their bias to engage their tread surfaces low end first with the roller to operate the type bars and for disengagement of the cams from the roller when the high ends of their tread surfaces reach the roller, and means operable upon the supporting portions of the cams for selectively rocking the cams against their bias into engagement with the roller.

16. A power mechanism for typewriting machines, as claimed in claim 15, wherein for tilting its tread surface bearing portion each cam has a screw threaded through said portion beyond the high end of its tread surface and rockably engaged with the supporting portion of the cam for rotation relatively thereto and against longitudinal movement of the screw relatively to said supporting portion.

17. A power mechanism for typewriting machines, as claimed in claim 16, wherein to limit the range of tilting of its tread surface bearing portion, the screw threaded through that portion has a head engageable by said portion to limit tilting thereof in one direction, and wherein the two cam portions are abuttive to limit tilting of the tread surface bearing portion in the other direction.

18. A power mechanism for typewriting machines comprising a power roller, a member biased to a rest position from which it is impellable in a path at a right angle to the roller, and a roll-free cam of adjustable eccentricity rotative by the roller to impel the member from rest position and having a body part held to said member for rotation about an axis which is parallel to the roller, said cam having a roller-engaging tread part which is pivotally held adjacent one end of said tread part to the body part of the cam for adjustment about a second axis which is parallel to the roller to vary the eccentricity of the cam, and said cam having an adjustment effecting and holding screw threaded through one of said two cam parts and rotatively engaged with the other one of said parts against movement of the screw in both directions of its length relatively to said other one of the cam parts.

19. A power mechanism for typewriting machines, as claimed in claim 18, wherein the screw has a head abuttive with the cam part through which the screw is threaded to thereby limit adjustment of the tread part of the cam in one direction, and wherein the two cam parts are abuttive to limit adjustment of the tread part in the opposite direction.

References Cited in the file of this patent

UNITED STATES PATENTS

| | | |
|---|---|---|
| 1,602,756 | Dorsey | Oct. 12, 1926 |
| 1,963,285 | Woodward | June 19, 1934 |
| 2,528,450 | Petz | Oct. 31, 1950 |
| 2,573,197 | Hart | Oct. 30, 1951 |